United States Patent
Roch

(10) Patent No.: US 10,374,964 B2
(45) Date of Patent: Aug. 6, 2019

(54) CONTROL CHANNEL COMPRESSION UPON CONGESTION DETECTION

(71) Applicant: Evelyne Roch, Kanata (CA)

(72) Inventor: Evelyne Roch, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 291 days.

(21) Appl. No.: 15/062,339

(22) Filed: Mar. 7, 2016

(65) Prior Publication Data

US 2017/0257319 A1    Sep. 7, 2017

(51) Int. Cl.
*H04L 12/811*    (2013.01)
*H04L 12/801*    (2013.01)

(52) U.S. Cl.
CPC .............. *H04L 47/38* (2013.01); *H04L 47/11* (2013.01)

(58) Field of Classification Search
CPC ........... H04L 47/11; H04L 47/12; H04L 47/38
See application file for complete search history.

(56) References Cited

U.S. PATENT DOCUMENTS

| | | | | |
|---|---|---|---|---|
| 6,738,351 B1 * | 5/2004 | Qureshi | ............. | H04L 41/5087 370/235 |
| 7,782,879 B2 | 8/2010 | Roch | | |
| 2012/0307634 A1 * | 12/2012 | Zhu | ........ | H04W 28/02 370/231 |
| 2014/0022904 A1 * | 1/2014 | Ahmad | ............ | H04W 28/0289 370/235 |
| 2015/0124604 A1 | 5/2015 | Dao et al. | | |

FOREIGN PATENT DOCUMENTS

| | | |
|---|---|---|
| CN | 101472295 A | 7/2009 |
| CN | 103379043 A | 10/2013 |
| WO | 2012170920 A1 | 12/2012 |
| WO | 104618254 A | 5/2015 |

* cited by examiner

*Primary Examiner* — Rhonda L Murphy

(57) ABSTRACT

Congestion in the control plane of a network may be handled by an individual node. The individual node may, upon determining that congestion has been detected on a link to another node, commence implementing a compression scheme on control packets outgoing on the link. The individual node may also transmit a notification of congestion on the link to further nodes farther away from a controller. The further nodes, responsive to receiving such notifications, may commence implementing a compression scheme on control packets outgoing on a control channel that includes the link. The various nodes may also transmit notifications of congestion to a controller. The controller may, upon determining that a count of cases of congestion in the network exceeds a threshold, transmit control packets to the nodes, where the control packet contains instructions to the nodes to implement compression on outgoing control packets.

19 Claims, 6 Drawing Sheets

CONTROL CHANNEL COMPRESSION UPON CONGESTION DETECTION

FIELD

The present application relates generally to communication on control channels and, more specifically, to compression of such communication upon detecting that the control channels are congested.

BACKGROUND

Software Defined Networking (SDN) is an approach to computer networking that allows network administrators to manage network services through decoupling the system that makes decisions about where traffic is sent (the control plane) from the underlying systems that forward traffic to the selected destination (the transport and data plane).

SDN can allow for centralized control of routing and other control plane functions. This can allow for lower cost networking nodes or, at least, nodes that do not need to know the network topology in order to route data. A centralized controller also allows for a better picture of the network. This more complete picture can allow for root causes of networking problems to be addressed even if the nodes affected by the solution are removed from the problem.

Signaling control networks (SCNs) designed for a distributed control plane may not have sufficient capacity to handle some centrally controlled SDN features. Notably, an optical network control plane may be regarded as an example distributed control plane.

SUMMARY

Congestion in the control plane of a network may be handled by an individual node. The individual node, upon determining that congestion has been detected on a control channel in a path toward a controller, commences implementing a compression scheme on outgoing control packets. The individual node may also transmit a notification of congestion on the control channel to node in a path away from the controller. The nodes away from the controller, responsive to receiving such notifications, commence implementing a compression scheme on control packets outgoing on a path toward the controller that includes the control channel. The various nodes may also transmit notifications of congestion to the controller. The controller, upon determining that a count of cases of congestion in the network exceeds a threshold, transmits control packets to the nodes, where the control packets contain instructions to the nodes to implement compression on outgoing control packets.

According to an aspect of the present disclosure, there is provided a method of operating a given node in a network, the given node connected to a controller via a control channel. The method includes detecting congestion on a link in the control channel, responsive to detecting congestion, generating a compressed control packet and transmitting the compressed control packet on the control channel. In other aspects of the present application, a node is provided with a processor for carrying out this method.

According to another aspect of the present disclosure, there is provided a method of operating a first node in a network, the first node connected to a controller via a control channel that includes a link to a second node and a further link. The method includes receiving a notification indicating that congestion has been detected on the further link, generating a control packet, responsive to the receiving, compressing the control packet to form a compressed control packet and transmitting the compressed control packet on the link to the second node. In other aspects of the present application, a node is provided with a processor for carrying out this method.

According to a further aspect of the present disclosure, there is provided a method of managing for execution by a control node in a network, the network having a plurality of nodes connected by a plurality of links. The method includes receiving, from nodes among the plurality of nodes, congestion notifications for associated links among the plurality of links, updating a count of cases of congestion in the network and responsive to determining that the count of cases of congestion exceeds a threshold, transmitting a control packet to a given node among the plurality of nodes, where the control packet contains instructions to the given node to implement compression on outgoing control packets. In other aspects of the present application, a controller is provided with a processor for carrying out this method.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

Figure 1:
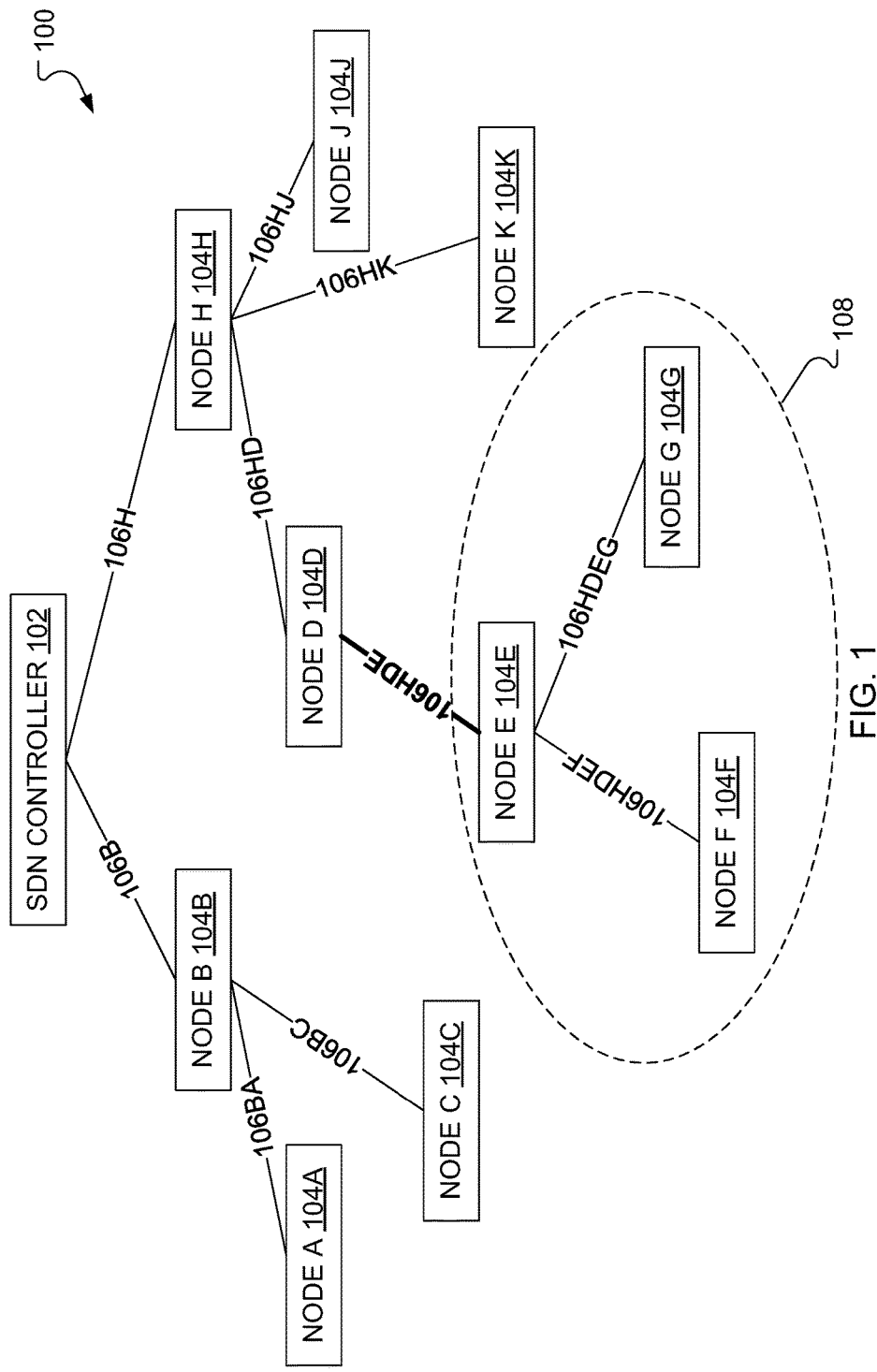
FIG. 1 illustrates a network including a plurality of nodes, connected by control channels and under control of an SDN controller.

FIG. 1 illustrates a network 100 including a plurality of nodes 104 under control of an SDN controller 102. The nodes 104 in the network 100 may be understood to form a control plane associated with an underlying transport plane of a communication network (not shown) such as, for example, an optical communication network. Between each of the nodes 104 in the network 100 are bidirectional links 106. As illustrated, each node has a single control channel to the SDN controller made of links 106.

Nodes among the plurality of nodes 104 are distinguished from each other through the use of letters, for ease of reference. The network 100 includes a node A 104A, a node B 104B, a node C 104C, a node D 104D, a node E 104E, a node F 104F, a node G 104G, a node H 104H, a node J 104J and a node K 104K.

Additionally, individual links 106 are denoted using the letters of the nodes defining a path from the SDN controller 102 to the node terminating that particular path. The network 100 includes: a link 106B connecting the SDN controller 102 to the node B 104B; a link 106H connecting the SDN controller 102 to the node H 104B; a link 106BA connecting the node B 104B to the node A 104A; a link 106BC connecting the node B 104B to the node A 104C; a link 106HD connecting the node H 104H to the node D 104D; a link 106HJ connecting the node H 104H to the node J 104J; a link 106HK connecting the node H 104H to the node K 104K; a link 106HDE connecting the node D 104D to the node E 104E; a link 106HDEF connecting the node E 104E to the node F 104F; and a link 106HDEG connecting the node E 104E to the node G 104G. The naming of a particular link 106 allows the reader to see the set of links needed to form the control channel. For example, Link 106HDEG goes between nodes G and E, and the path of the control channel would be from node G 104G to node E 104E to node D 104D to node H 104H to the SDN controller 102.

It is known that nodes in data communication networks may communicate over control channels in a logical arrangement that may be referred to as a distributed control plane. A network of nodes connected in a distributed control plane may be referred to as a Signaling Control Network.

Indeed, in operation of the network 100 of FIG. 1, the control channels allow the SDN controller 102 to instruct (transmit control packets to the nodes 104) and monitor the operation of the nodes 104 (receive control packets from the nodes 104).

Figure 2:
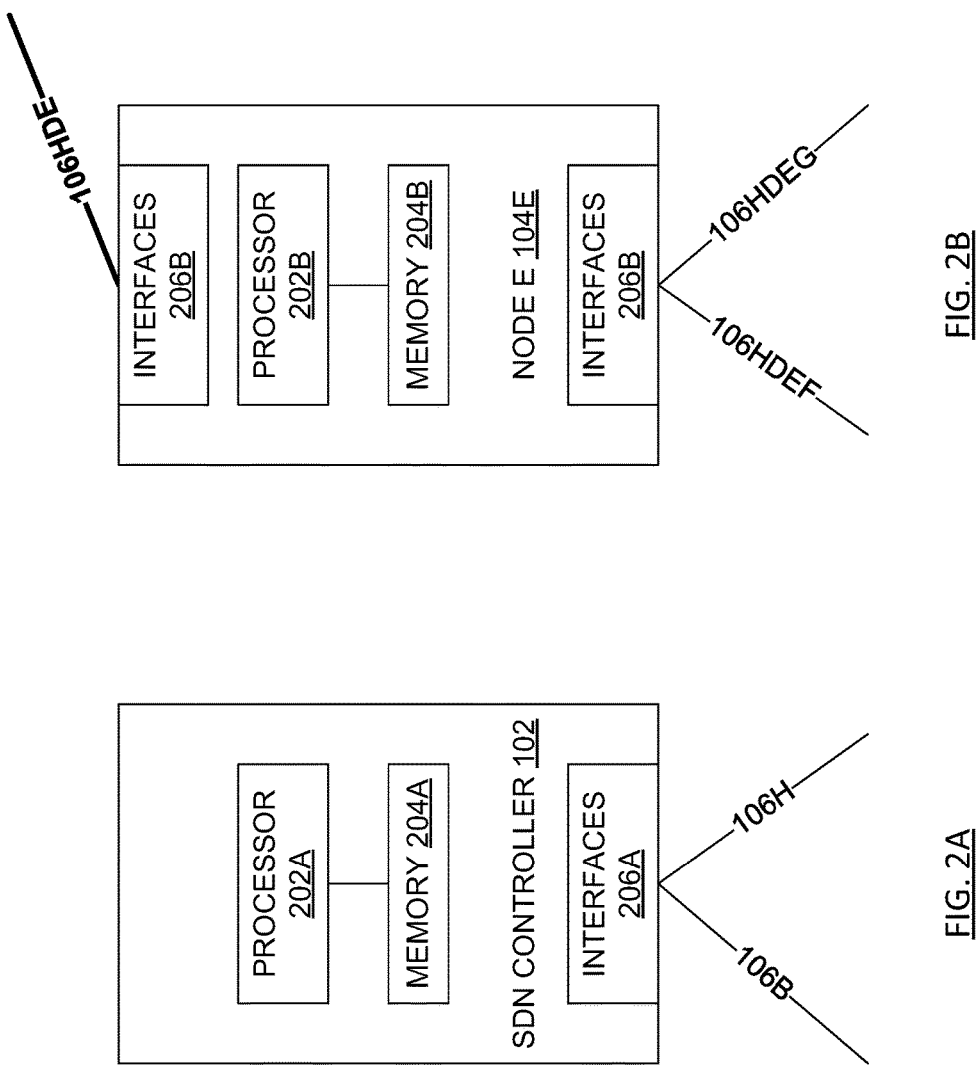
FIG. 2A illustrates, in a functional block diagram, elements of the SDN controller of FIG. 1.
FIG. 2B illustrates, in a functional block diagram, elements of one node among the plurality of nodes of FIG. 1.

As illustrated in FIG. 2A, the SDN controller 102 may be understood to comprise a processor 202A, a memory 204A and interfaces (electrical, optical) 206A appropriate to the distributed control plane of the communication network.

The term "node" is used herein for an element 104 of communications network equipment that may variously be called a switch, a router, an optical cross-connect, a reconfigurable add-drop multiplexer or converged packet-optical equipment, among other terms. Those skilled in the art will appreciate that in some embodiments, some or all of the functional entities in network 100 may be virtual entities, and the illustrated links may be logical connections. For the purposes of a simplified discussion, the following disclosure will address embodiments in which physical entities are discussed. This should not be interpreted as limiting the scope of the present invention. As illustrated in FIG. 2B, a node such as node E 104E may be understood to comprise a processor 202B, a memory 204B and interfaces (electrical, optical) 206B appropriate to both the control plane and the transport plane of the communication network.

Replacing deployed equipment and transport links to upgrade an existing transport network is considered to be very expensive. Accordingly, network operators may consider enhancing functionality in existing transport networks as an alternative upgrade path. One manner in which an existing transport network may be enhanced is through the addition of an SDN controller. Through such an addition, the network operator may enhance the operation of a transport network by implementing centrally controlled SDN features. Centrally controlled SDN features may, for example, include instructing establishment of new logical connections in the transport network and instructing nodes to repair failed connections in the transport network. Signaling Control Networks designed for use in a distributed control plane may not have sufficient capacity to handle some of the centrally controlled SDN features. It should be understood that although the control plane and data plane of a network are often described as being as separate networks, traffic in each of the planes is typically carried over the same physical links. Thus, increasing the traffic in a control plane may result in traffic congestion.

Indeed, congestion on the control channels may result in packet loss in either the control or data planes. Such packet loss may act to block establishment of new connections. Furthermore, packet loss may result in difficulties in repairing failed connections.

In overview, a given node 104 in the network 100 may implement aspects of the present application by determining that congestion, which may be considered to be traffic in excess of a threshold, has been detected on a link 106 that forms part of its control channel. In response to the detection of congestion, the node implements a compression scheme on control traffic. The node 104 may also inform the SDN controller 102 that compression has been enabled, so that the SDN controller 102 can notify other nodes 104 that would be impacted by the congested link. In another embodiment, the given node 104 can notify another node, whose control channel uses the congested link, of the congestion. When the congestion has been sufficiently reduced, the given node 104 may then cease the application of compression of the control traffic. Upon detecting a change in congestion, the node 104 may inform SDN controller 102. The SDN controller 102 may then instruct nodes to cease the use of control channel compression. In another embodiment, the node 104 that detects the easing of congestion can notify other nodes, which use the no-longer congested link as part of the control channel, of the abatement of congestion.

Figure 3:
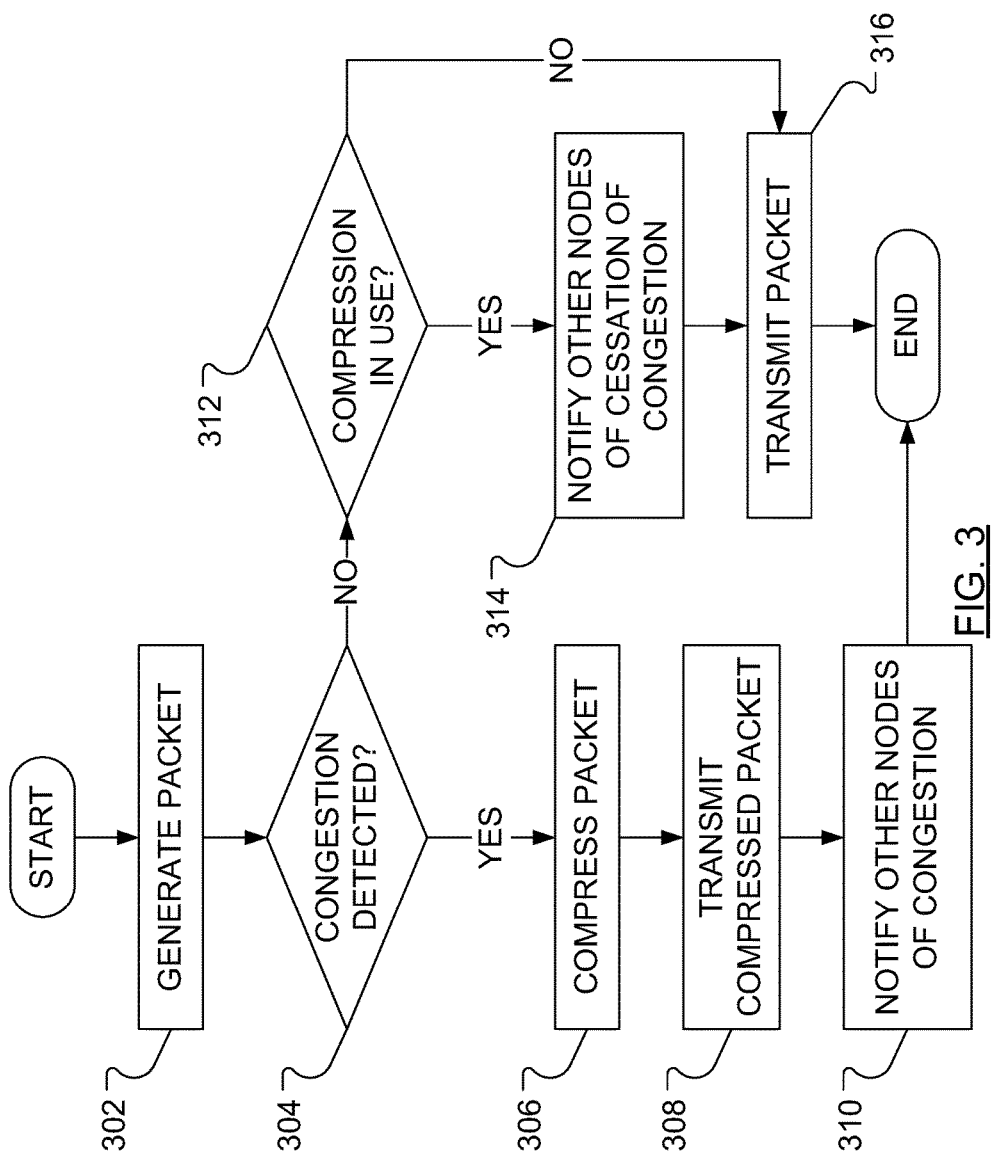
FIG. 3 illustrates example steps in a method of mitigating congestion on a control channel in the network of FIG. 1.

Operation of a given node, such as the node E 104E, may be considered in view of example steps in a method of mitigating congestion on a link in a control channel, as illustrated in FIG. 3. The node E 104E generates (step 302) a control packet to be transmitted on the link 106HDE towards the node D 104D. It will be understood that in some embodiments, the step of generating a packet (step 302) will include receiving a packet from another node for transmission to node D 104D. The node E 104E determines (step 304) whether congestion has been detected on the link 106HDE. Responsive to determining (step 304) that congestion has been detected, the node E 104E compresses (step 306) further control packets. It should be noted that if control packets transmitted before the detection of congestion are dropped as a result of the congestion, re-transmission of the control packets may be done using compression.

As will be understood by a person of ordinary skill in the art, there are many ways in which a control packet may be compressed. The specifics of packet compression schemes available to a person implementing aspects of the present application are considered to be outside the purview of the present application.

Upon completing the compression of the control packet (step 306), the node E 104E transmits (step 308) the compressed control packet. Additionally, the node E 104E may transmit (step 310) a notification to other nodes 104 that link 106HDE is congested. For example, the node E 104E may recognize that the link 106HDE is in the control channel to the SDN controller 102 for each of the node F 104F and the node G 104G. As part of transmitting (step 310) the notification of congestion to the other nodes 104, the node E 104E may also transmit (step 310), to the SDN controller 102, the notification of congestion on the link 106HDE.

When, in step 304 congestion is not detected on link 106HDE, the node E 104E may determine (step 312) whether compression is in use as a consequence of congestion having been detected previously. Where compression is not in use, the node proceeds, in step 316, to transmit the generated packet. If no congestion is detected in step 304, and compression is determined to be in use in step 312, the node E 104E may determine that congestion is no longer present on the link and, in step 314, notify other nodes using the no-longer congested link that the congestion has abated. In step 316, the generated packet is transmitted.

As part of notifying other nodes (step 314) of the cessation of congestion, the node E 104E may transmit (step 314) notification of cessation of congestion to the SDN controller 102. This may be done in addition to, or in place of, notification of the other nodes. If the SDN controller 102 is notified at the onset of congestion, and it is the source of instruction to the other nodes that would be impacted by the congested link, then the SDN controller 102 may be the only node to which Node E 104E transmits a notification in step 314.

As will be understood by a person of ordinary skill in the art, there are many ways in which congestion may be detected. For example, the node D 104D may be configured to transmit an acknowledgement of receipt of a control packet from the node E 104E. The node E 104E may determine a delay between transmission, to the node D 104D, of a control packet and receipt, from the node D 104D, of an acknowledgement. Where the determined delay exceeds a threshold, the node E 104E may consider that congestion has been detected on the link 106HDE between the node E 104E and the node D 104D. In another embodiment, because all traffic on the link 106HDE towards the SDN Controller 102 must transit through node E 104E, the node E 104E may be configured to know a capacity for link 106HDE. Node E 104E can then monitor the traffic being placed onto link 106HDE and, based on a comparison of the known traffic and known capacity, a determination of congestion can be made.

Notably, rather than determining (step 304) whether congestion has been detected on the control channel 106HDE towards the node D 104D every time a control packet is generated, such determining (step 304) may only be carried out with a predetermined periodicity. The node E 104E may, in such a case, be configured to compress (step 306) outgoing control packets for a fixed time period. The duration of the fixed time period may be shorter than the period of the periodic determining (step 304).

Figure 4:
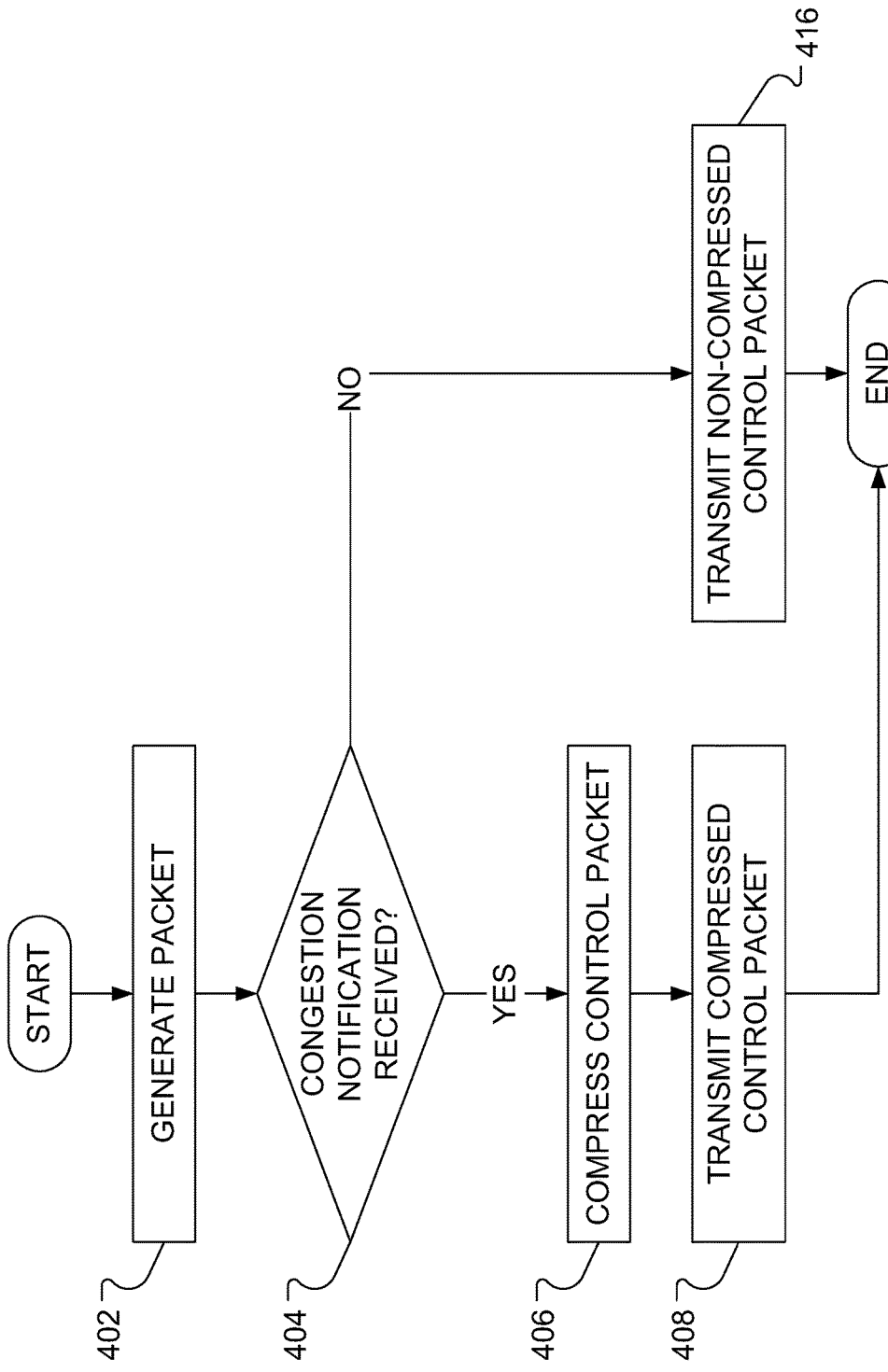
FIG. 4 illustrates example steps in a method of mitigating congestion on a control channel in the network of FIG. 1, carried out at a node for which a path to the SDN controller of FIG. 1 includes a congested control channel.

Operation of one of the other nodes, that is, nodes that may receive instructions from a node 104 in the path to the SDN controller 102 (either from the node 104 or from the SDN controller 102 in response to notification from the node 104 that detected congestion), such as the node F 104F, may be considered in view of example steps in a method of mitigating congestion on a control channel, as illustrated in FIG. 4. The node F 104F may generate (step 402) a control packet to be transmitted on its control channel. The path of the control channel starts with link 106HDEF. The node F 104F may determine (step 404) whether a notification of congestion on one of the links 106 in the control channel to the SDN controller 102 has been received. Responsive to determining (step 404) that a notification of congestion has been received, and no subsequent revocation of the notification has been received, the node F 104F compresses (step 406) the control packet. Upon completing the compressing (step 406) of the control packet, the node F 104F may transmit (step 408) the compressed control packet towards the node E 104E.

When, in step 404, it is determined that a notification of congestion has not been received, the node F 104F transmits (step 416) the control packet without compression. As will be understood, determining (step 404) that a notification of congestion has not been received may incorporate a scenario wherein a notification of congestion has been received followed by receipt of a notification of cessation of congestion.

Figure 5:
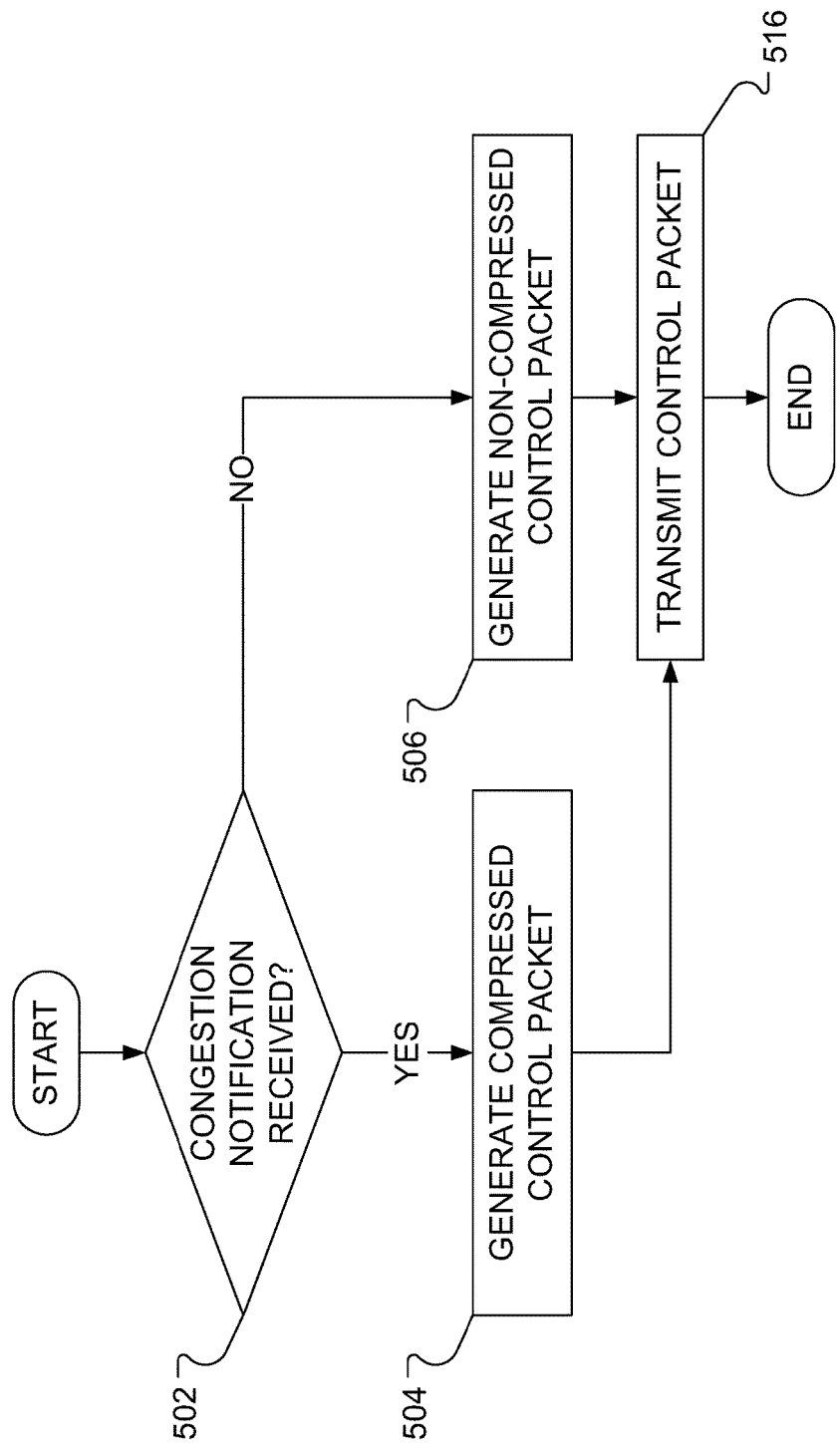
FIG. 5 illustrates example steps in a method, as an alternative to the method of FIG. 4, of mitigating congestion on a control channel in the network of FIG. 1, carried out at a node for which a path to the SDN controller of FIG. 1 includes a congested control channel.

Operation of one of the other nodes (that is, nodes that may receive instructions from a node 104 in the path to the SDN controller 102), such as the node F 104F, may be considered in view of example steps in a method, as an alternative to the method of FIG. 4, of mitigating congestion on a control channel, as illustrated in FIG. 5. The node F 104F may determine (step 502) whether a notification of congestion on one of the links 106 in the control channel to the SDN controller 102 has been received. Responsive to determining (step 502) that a notification of congestion has been received, and no subsequent revocation of the notification has been received, the node F 104F generates (step 504) a compressed control packet. The node F 104F then transmits (step 516) the compressed control packet towards the node E 104E. Responsive to determining (step 502) that a notification of congestion has not been received, or that subsequent to such receipt a revocation of the notification has been received, the node F 104F generates (step 506) a non-compressed control packet. The node F 104F then transmits (step 516) the non-compressed control packet towards the node E 104E. One skilled in the art will appreciate that the determination of whether a congestion notification has been received in step 502 or step 404 may be understood to be determining if a congestion flag has been set. A node receiving an indication of congestion would set a configuration flag indicating that compression is required. Upon receipt of a notification that congestion has abated, the flag would be cleared.

Figure 6:
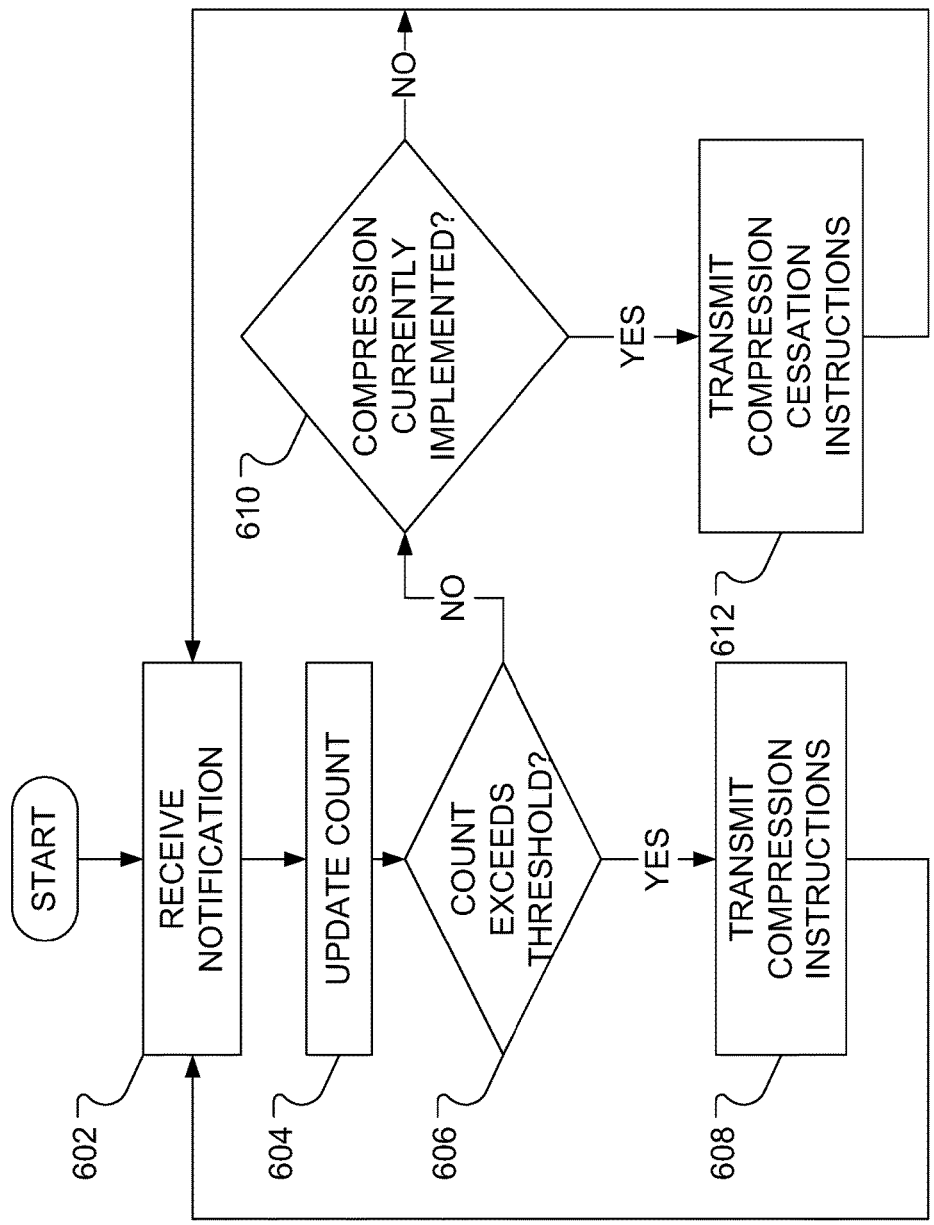
FIG. 6 illustrates example steps in a method, carried out at the SDN controller of FIG. 1, of mitigating congestion in a control channel of the network of FIG. 1.

Operation of the SDN controller 102 may be considered in view of example steps in a method of mitigating congestion in a control plane, as illustrated in FIG. 6. The SDN controller 102 receives (step 602) congestion notification from a node 104 of the network 100. Congestions notifications may be received from different nodes. Each of the congestion notifications indicates either congestion or cessation of a case of congestion on a particular link. Based on the received notification, the SDN controller 102 updates (step 604) a count of cases of congestion in the network 100. It should be understood that if the SDN controller 102 is receiving both indications that congestion has been detected, and indications that congestion has been alleviated, the step of updating the count 604 can include both incrementing and decrementing a counter. The SDN controller 102 determines (step 606) whether the count of cases of congestion exceeds a predetermined threshold. Responsive to determining (step 606) that the count of cases of congestion exceeds the predetermined threshold, the SDN controller 102 can treat the entire network (or an entire section of the network) as suffering from congestion. To alleviate congestion in the entire network, the SDN controller 102 transmits (step 608) control packets, to each of the nodes 104 in the network 100, containing instructions to implement compression on outgoing control packets. The SDN controller 102 may then proceed to receive (step 602) further notifications from the nodes 104.

Rather than transmitting control packets to all of the nodes 104 in the network 100, the SDN controller 102 may determine a subset of nodes that are subject to the congestion. If, for example, there is congestion on link 106HDE, the SDN controller 104 may define a subset 108 of nodes affected by the congestion. Because node E 104E, node F 104F and node G 104G all make use of the congested link 106HDE, they would form the subset 108 of nodes suffering from congested control channels. In this case, the SDN controller 104 transmits (step 608) control packets to each node 104 in the subset 108. The subset 108 may be representative of a region of the network 100.

Responsive to determining (step 606) that the count of congestion notifications does not exceed the predetermined threshold, the SDN controller 102 may determine (step 610) whether compression is currently being implemented. Notably, the compression that is currently being implemented may be network-wide or more localized. Responsive to determining (step 610) that compression is currently being implemented, the SDN controller 102 may transmit (step 612) control packets, to each of the nodes 104 in the network 100, containing instructions to the nodes 104 to cease implementing compression on control packets. The SDN controller 102 may then proceed to receive (step 602) further notifications from the nodes 104.

Responsive to determining (step 610) that compression is not currently being implemented, the SDN controller 102 may simply proceed to receive (step 602) further notifications from the nodes 104.

Those skilled in the art will appreciate that, although the above discussion of the operation of the SDN controller 102 focused on recognizing network wide congestion, the SDN controller 102 may also act to address local congestion. If Node E 104E sends a notification of congestion on link 106HDE to SDN controller 102, the controller can send an instruction to use compression to any node that uses link 106HDE, as part of its control plane connection. When node E 104E sends a message indicative of the alleviation of congestion on link 106HDE, SDN controller 102 can determine an appropriate action, including instructing other nodes that use link 106HDE as part of their control channel that control plane compression is no longer needed. It should be noted that the traffic levels used to indicate congestion may be different (e.g., higher) than the traffic levels required to justify declaring an end to congestion. This difference in the threshold values may vary with the position of the link in the network.

Conveniently, aspects of the present application may find use in optical transport networks with limited SCN capabilities when such optical transport networks are migrated to an SCN-based approach. Also, aspects of the present application may find use to minimize congestion in existing SCN networks. Indeed, operators of an existing SCN network may find the amount of control information that may be transmitted across the existing SCN network increased through use of aspects of the present application.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of operating a non-controller node in a network, the method comprising:

detecting, by the non-controller node, congestion on a first link in a control channel connecting the non-controller node to a controller of the network;
responsive to detecting congestion, generating at the non-controller node a compressed control packet;
transmitting, by the non-controller node, the compressed control packet on the control channel; and
transmitting, by the non-controller node, a notification of congestion to a second node in the network, the second node not being directly connected by the first link.

2. The method of claim 1 wherein the step of detecting congestion includes determining that traffic on the first link exceeds a threshold.

3. The method of claim 1 wherein the generating the compressed control packet includes:
generating a non-compressed control packet; and
compressing the generated control packet.

4. The method of claim 1 wherein the second node is another non-controller node in the network having a control channel traversing the first link on which congestion is detected.

5. The method of claim 1 wherein the second node is a controller of the network.

6. The method of claim 1 further comprising:
responsive to detecting an abatement of congestion on the first link, transmitting an uncompressed control packet, toward a controller of the network.

7. The method of claim 6 wherein detecting the abatement of congestion includes determining that traffic on the first link is below a second threshold.

8. The method of claim 6 further comprising notifying the second node in the network of the detection of the abatement of congestion.

9. The method of claim 8 wherein notifying another the second node in the network includes transmitting a notification of the abatement of congestion to the second node in the network.

10. The method of claim 9 wherein the second node is another non-controller node in the network having a control channel traversing the first link on which the abatement of congestion is detected.

11. The method of claim 9 wherein the second node is the controller.

12. The method of claim 1 wherein the step of detecting includes receiving a notification of congestion from a third node.

13. A non-controller node in a network comprising:
a memory storing instructions;
a processor adapted, by the instructions, to cause the non-controller node to:
generate a control packet;
detect congestion on a first link in a control channel connecting the non-controller node to a controller of the network;
responsive to detecting congestion, compress the control packet to form a compressed control packet;
transmit the compressed control packet on the control channel; and
transmit a notification of congestion to a second node in the network, the second node not being directly connected by the first link.

14. A method of operating a first non-controller node in a network, the method comprising:
receiving a notification from a second non-controller node that is connected to the first non-controller node by a first link, the notification indicating that congestion has been detected on a second link not connected to the first non-controller node, the first and second link being part of a control channel connecting the first non-controller node to a controller of the network;

generating a control packet;

responsive to the receiving, compressing the control packet to form a compressed control packet; and transmitting the compressed control packet on the first link.

15. The method of claim 14 further comprising:

receiving a further notification indicating detection of an abatement of congestion on the second link;

generating a further control packet; and responsive to the receiving, transmitting the further control packet, without compression, on the first link.

16. A first non-controller node in a network comprising:

a memory storing instructions;

a processor adapted, by the instructions, to cause the first non-controller node to:

receive a notification from a second non-controller node that is connected to the first non-controller node by a first link, the notification indicating that congestion has been detected on a second link not connected to the first non-controller node, the first and second link being part of a control channel connecting the first non-controller node to a controller of the network;

generate a control packet;

compress the control packet to form a compressed control packet; and transmit the compressed control packet on the first link.

17. A method of managing for execution by a control node in a network, the network having a plurality of nodes connected by a plurality of links, the method comprising:

receiving, from nodes among the plurality of nodes, congestion notifications for associated links among the plurality of links;

updating a count of cases of congestion in the network; and responsive to determining that the count of cases of congestion exceeds a threshold, transmitting a control packet to a given node among the plurality of nodes, where the control packet contains instructions to the given node to implement compression on outgoing control packets.

18. The method of claim 17 further comprising transmitting control packets to the plurality of nodes, where the control packets contain instructions to the nodes to implement compression on outgoing control packets, thereby implementing network-wide compression.

19. A software defined networking controller in a network, the network having a plurality of nodes connected by a plurality of links, the software defined networking controller comprising:

a memory storing instructions;

a processor adapted, by the instructions, to:

receive, from nodes among the plurality of nodes, congestion notifications for associated links among the plurality of links;

update a count of cases of congestion in the network; and transmit a control packet to a given node among the plurality of nodes, where the control packet contains instructions to the given node to implement compression on outgoing control packets.

* * * * *